(12) United States Patent
Irie et al.

(10) Patent No.: US 6,884,847 B2
(45) Date of Patent: Apr. 26, 2005

(54) TRANSPARENT ELASTOMER COMPOSITION

(75) Inventors: Sadashige Irie, Settsu (JP); Kazuyoshi Mimura, Matsusaka (JP); Hirofumi Nishibayashi, Settsu (JP); Hiroyuki Tanaka, Settsu (JP); Tsuyoshi Noguchi, Settsu (JP); Mitsuru Kishine, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/758,041

(22) Filed: Jan. 16, 2004

(65) Prior Publication Data

US 2004/0147676 A1 Jul. 29, 2004

Related U.S. Application Data

(62) Division of application No. 10/089,523, filed as application No. PCT/JP00/06631 on Sep. 27, 2000, now Pat. No. 6,756,445.

(30) Foreign Application Priority Data

Sep. 30, 1999 (JP) ............................................ 11-277995

(51) Int. Cl.$^7$ .................. C08L 21/00; C08L 23/00; C08L 23/02; C08L 27/12; C08K 5/00
(52) U.S. Cl. .................. 525/191; 525/200; 525/209; 525/221; 525/222; 525/232; 525/238; 525/240; 264/164; 264/165; 264/176.1; 264/219
(58) Field of Search ................... 525/191, 200, 525/209, 221, 222, 232, 238, 240; 264/164, 165, 176.1, 219

(56) References Cited

U.S. PATENT DOCUMENTS 3,853,809 A 12/1974 Martin et al.
4,348,312 A 9/1982 Tung
4,713,418 A 12/1987 Logothetis et al.
6,160,053 A 12/2000 Enokida et al.
6,395,834 B1 5/2002 Albano et al.
6,476,144 B1 11/2002 Okanishi et al.

FOREIGN PATENT DOCUMENTS

| DE | 199 09 574 A1 | 3/1999 |
| EP | 0 872 495 A1 | 10/1998 |
| EP | 1 029 875 A1 | 8/2000 |
| EP | 1 031 607 A1 | 8/2000 |
| JP | 61-247966 A | 11/1986 |
| JP | 683831 | 9/1990 |
| JP | 2-261850 A | 10/1990 |
| JP | 6-283831 A | 10/1994 |
| JP | 11-315180 A | 11/1999 |
| WO | WO 99/24484 A1 | 5/1999 |

OTHER PUBLICATIONS

Taiwanese Office Action for Patent Application No. 89120192 dated Mar. 8, 2004.
Supplementary European Search Report EP 00 96 2855 dated Oct. 15, 2004.
Patent Abstracts of Japan 11199739 published Jul. 27, 1999.
Patent Abstracts of Japan 58206645 published Dec. 1, 1983.
Patent Abstracts of Japan 60137951 published Jul. 22, 1985.

*Primary Examiner*—Nathan M. Nutter
(74) *Attorney, Agent, or Firm*—Sughrue Mion, PLLC

(57) ABSTRACT

A transparent elastomer composition is obtained by co-coagulation of an emulsion of fluorine-containing resin fine particles having an average particle size of from 20 to 150 nm and an emulsion of elastomer particles, in which the fluorine-containing resin fine particles are finely dispersed uniformly in the elastomer. The transparent elastomer composition provides an elastomeric molded article having excellent mechanical strength, abrasion resistance and transparency.

6 Claims, 2 Drawing Sheets

TRANSPARENT ELASTOMER COMPOSITION

CROSS REFERENCE TO RELATED APPLICATIONS

This is a divisional of application Ser. No. 10/089,523 filed Mar. 29, 2002, and now U.S. Pat. No. 6,756,445, which is a 371 of PCT Application No. PCT/JP00/06631 filed Sep. 27, 2000, incorporated herein by reference.

TECHNICAL FIELD

The present invention relates to a transparent composition comprising an elastomer and fine particles of fluorine-containing resin, for example, a transparent elastomer composition comprising a fluorine-containing elastomer as a matrix and fine particles of fluorine-containing resin which are finely dispersed in the elastomer. The elastomer composition can provide a molded article having enhanced mechanical strength and is useful as a base elastomer for various molded articles. Further, the elastomer composition can provide an elastomeric molded article which is excellent in mechanical strength and transparency by adding an additive thereto.

BACKGROUND ART

It has been known that a fluorine-containing resin is added to a fluorine-containing elastomer. An object of the addition is to enhance mechanical strength by using the fluorine-containing resin as a clean filler and utilizing its friction property thereof. Methods, for mixing the resin and the elastomer, include a dry blend method by using a usual rubber mixing roll, and a method for enhancing dispersibility by using a solvent, and the like.

For example, in JP-A-55-151051, a fluorine-containing rubber excellent in abrasion resistance is obtained by blending a low molecular weight polytetrafluoroethylene (PTFE). Also, JP-A-63-178149 describes a method of adding and mixing a PTFE powder to a fluorine-containing rubber solution to enhance the gas barrier property and mechanical strength of the rubber. Further, JP-A-2-261850 proposes that a fluorine-containing resin is blended in a large amount of from 30 to 150 parts by weight together with an organic solvent to 100 parts by weight of a rubber to lower a friction coefficient and to enhance mechanical properties.

An example of an addition of a fluorine-containing resin to obtain cleanliness is described in WO97/08239. WO97/08239 discloses that a composition prepared by adding 5 to 50 parts by weight of a fluorine-containing resin powder having an average particle size of from 0.2 to 50 μm to 100 parts by weight of a fluorine-containing rubber is excellent as a sealing agent for etching equipment. Also, WO95/02634 discloses that a composition prepared by adding 2 to 50 parts by weight of a fluorine-containing resin fine powder to 100 parts by weight of a rubber component is a clean composition suitable for a wet process of semiconductors.

However, those prior techniques are directed to adding and mixing a fluorine-containing resin to a matrix rubber (elastomer). Although the dispersibility may be enhanced by using a solvent, as a particle size becomes finer, a uniform dispersion is difficult to obtain. For example, when fine particles of a fluorine-containing resin are dispersed in a transparent elastomer, if they are dispersed uniformly, the composition should be transparent. Yet, a transparent elastomer composition in which a fluorine-containing resin is finely uniformly dispersed has not yet been obtained.

If fine particles of a fluorine-containing resin are not dispersed uniformly, a strength of a molded article obtained by vulcanizing and molding is low and the effect of adding the fluorine-containing resin is not obtained sufficiently.

It is therefore an object of the present invention to provide an elastomer composition wherein fluorine-containing resin fine particles are dispersed uniformly in a transparent elastomer, and which can exhibit the maximum effect of adding the fluorine-containing resin.

DISCLOSURE OF INVENTION

The present invention relates to a transparent elastomer composition in which fine particles of a fluorine-containing resin are finely dispersed in a transparent elastomer.

It is preferable that the transparent elastomer as a matrix is a fluorine-containing elastomer. Also, it is preferable that the fine particles of a fluorine-containing resin have an average particle size of from 20 to 150 nm.

The present invention also relates to an elastomer composition containing a crosslinking agent and as required, a crosslinking accelerator and a filler.

The elastomer composition of the present invention can be prepared, for example, by mixing an emulsion of transparent elastomer particles and an emulsion of fluorine-containing resin fine particles and then co-coagulating the resulting mixture.

The present invention also relates to an elastomeric molded article obtained by vulcanizing and molding the above-mentioned elastomer composition. The present invention further relates to a transparent elastomeric molded article.

In the present invention, being transparent means that a haze value mentioned hereinbelow is not more than 50%.

BEST MODE FOR CARRYING OUT THE INVENTION

Figure 1:
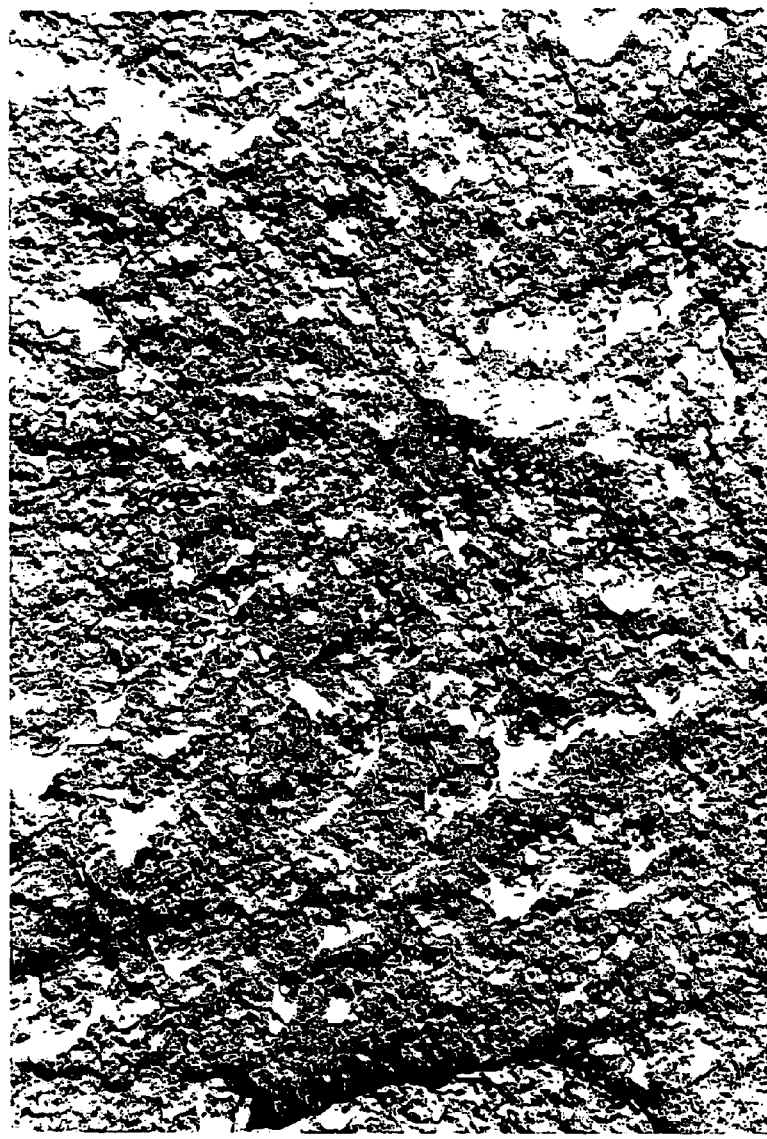
FIG. 1 is a photograph (×20000) taken by a transmission type electron microscope of the elastomer composition obtained in Example 1 of the present invention.

In the present invention, uniform dispersion of fine particles of a fluorine-containing resin is achieved by mixing an emulsion of transparent elastomer particles and an emulsion of fluorine-containing resin fine particles and then co-coagulating the mixture.

Whether or not the fluorine-containing resin fine particles are dispersed finely uniformly can be seen clearly by observing through a transmission type electron microscope (TEM) (cf. FIG. 1 explained hereinbelow) or can be judged by determining whether or not transparency of the transparent matrix elastomer is maintained even after mixing of the fluorine-containing resin fine particles. In other words, the mixture obtained by dispersing is turbid in white, even if the dispersing is carried out, either by a dry blend method in which the mixing is carried out after the fluorine-containing resin fine particles having the same fine particle size are once coagulated and dried, or by a method of mixing by using a solvent. It is believed that this is because the fluorine-containing resin fine particles are subject to secondary agglomeration or are dispersed locally (cf. FIG. 2 explained hereinbelow).

The elastomer composition of the present invention before crosslinking has a transparency of not more than 50%, preferably not more than 40%, particularly not more than 30% in a haze value.

For the matrix elastomer in the present invention, any transparent elastomer capable of forming an emulsion in the form of particles and having affinity for the fluorine-containing resin can be used. From this point of view, a fluorine-containing elastomer is preferable.

Examples of the fluorine-containing elastomer are, for instance, copolymer elastomers (tetrafluoroethylene (TFE)/perfluoro (alkyl vinyl ether) (PAVE) elastomers) represented by the formula (1):

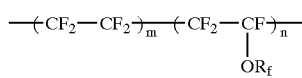

wherein m/n=95 to 50/5 to 50 (% by mole, hereinafter the same), $R_f$ is a perfluoroalkyl group having 1 to 8 carbon atoms, terpolymer elastomers (TFE/hexafluoropropylene (HFP)/ PAVE elastomers) represented by the formula (2):

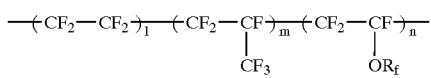

wherein l/m/n=95 to 35/0 to 30/5 to 35, $R_f$ is a perfluoroalkyl group having 1 to 8 carbon atoms, copolymer elastomers represented by the formula (3):

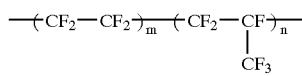

wherein m/n=85 to 60/15 to 40, terpolymer elastomers represented by the formula (4):

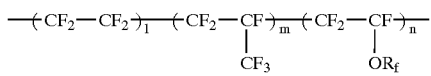

wherein l/m/n=85 to 20/0 to 40/15 to 40, terpolymer elastomers represented by the formula (5):

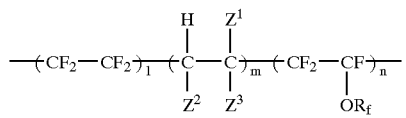

wherein l/m/n=95 to 45/0 to 10/5 to 45, $Z^1$, $Z^2$ and $Z^3$ are fluorine atoms or hydrogen atoms independently, $R_f$ is a perfluoroalkyl group having 1 to 8 carbon atoms,

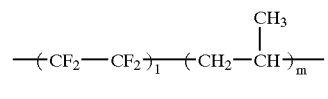

(l/m = 20 to 80/80 to 20),

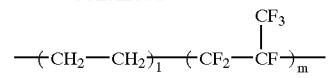

(l/m = 80 to 50/20 to 50),

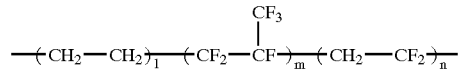

(l/m/n = 10 to 65/15 to 45/0.1 to 45),

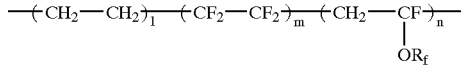

(l/m/n = 1 to 80/0 to 80/10 to 50, $R_f$ is as defined above), and the like.

More specifically, there are TFE/PAVE copolymer elastomer, vinylidene fluoride (VdF)/hexafluoropropylene (HFP) copolymer elastomer, VdF/HFP/TFE copolymer elastomer, VdF/TFE/PAVE copolymer elastomer, and the like. A small amount of a monomer having a crosslinkable reaction group may be copolymerized with those elastomers. Examples of the crosslinkable reaction group are, for instance, iodine atom, bromine atom, nitrile group, carboxyl group, unsaturated double bond, hydroxyl group, and the like.

The fluorine-containing elastomers can be prepared by usual emulsion polymerization method. The obtained polymerization reaction product which is an emulsion can be used as is for co-coagulation to be described hereinbelow, or can be used for the co-coagulation after optionally adjusting the concentration thereof. The emulsion may be dried and then formed into an emulsified dispersion again.

Examples of the elastomer other than the fluorine-containing elastomer are, hydrogenated nitrile butadiene rubber, acrylic rubber, silicone rubber, and the like.

An average particle size of the elastomer particles in the emulsion is not particularly limited, and is, for example, from 10 to 800 nm, preferably from 20 to 500 nm. However, when the average particle size is less than 10 nm, the coagulation becomes difficult, and when the average particle size is more than 800 nm, the emulsion becomes unstable and the co-coagulation becomes difficult.

The fine particles of the fluorine-containing resin to be finely dispersed into the elastomer are not particularly limited. For example, there are fine particles of:
(1) polytetrafluoroethylene (PTFE);
(2) TFE/$CF_2$=CF—O—$R_f^1$ (FVE) copolymer (in a proportion exhibiting a non elastomeric property for example, wherein the non-elastomer component, i.e., $CF_2$=CF—O—$R_f^1$ is not more than 15% by mole. $R_f^1$ is a linear or branched fluoro- or perfluoroalkyl group or a fluoro- or perfluorooxyalkyl group which may have an ether type oxygen atom.). For example, TFE/PAVE copolymer (PFA);
(3) TFE/$CF_2$=CF—$R_f^1$ copolymer (in a proportion exhibiting a non elastomeric property for example, wherein the non-elastomer component, i.e., $CF_2$=CF—$R_f^1$ is not more than 15% by mole. $R_f^1$ is as defined above.) For example, TFE/HFP copolymer (FEP);
(4) Ethylene/TFE (30 to 60/70 to 40% by mole) copolymer;
(5) Polychlorotrifluoroethylene (PCTFE);
(6) Ethylene/chlorotrifluoroethylene (CTFE) (30 to 60/70 to 40% by mole) copolymer;
(7) Polyvinylidene fluoride (PVdF);
(8) Vinylidene fluoride (VdF)/TFE (70 to 99/30 to 1% by mole) copolymer;

(9) VdF/TFE/CTFE (50 to 99/30 to 0/20 to 1% by mole) copolymer;
(10) VdF/TFE/HFP (60 to 99/30 to 0/10 to 1% by mole) copolymer;
(11) Ethylene/TFE/HFP (6 to 60/40 to 81/1 to 30% by mole) copolymer;
(12) 3,3,3-trifluoropropylene-1,2-trifluoromethyl-3,3,3-trifluoropropylene-1/PAVE (40 to 60/60 to 40% by mole) copolymer; and the like. Among them, when a low friction property is imparted to the molded article, the above-mentioned (1) is preferred. Particularly, in order to enhance compatibility with the perfluoroelastomer component, the above-mentioned (2) and (3) are preferred.

The PTFE of the above-mentioned (1) encompasses not only TFE homopolymer but also a modified PTFE obtained by copolymerizing a comonomer in such a small amount as not giving melt-flowability. Examples of the comonomer are HFP, CTIFE, perfluorovinylether, trifluoroethylene, perfluoroalkylethylene, and the like. When perfluorovinylether is used as a comonomer, its amount is up to 2% by weight, preferably from 0.001 to 1% by weight, more preferably from 0.01 to 1% by weight.

The fluorine-containing resins can be prepared by usual emulsion polymerization method. The obtained polymerization product which is an emulsion can be used as is for co-coagulation to be described hereinbelow, or can be used for the co-coagulation after optionally adjusting the concentration thereof. The emulsion may be once dried and then formed into an emulsified dispersion again.

An average particle size of the fluorine-containing resin fine particles in the emulsion is less than 150 nm, preferably from 20 to 150 nm, more preferably from 20 to 100 nm. When the average particle size is too small, productivity is lowered remarkably, and when the average particle size is not less than 200 nm, a uniform dispersion cannot be obtained.

The mixing ratio of the elastomer and the fluorine-containing resin may be selected optionally depending on properties to be imparted to the molded article. It is desirable that the amount of the fluorine-containing resin is not less than 1 part by weight, preferably not less than 5 parts by weight based on 100 parts by weight of the elastomer from the viewpoint of obtaining a reinforcing effect, and is not more than 150 parts by weight, preferably not more than 100 parts by weight, more preferably not more than 50 parts by weight based on 100 parts by weight of the elastomer from the viewpoint of easiness in processing of the obtained crosslinked rubber.

The elastomer and the fluorine-containing resin in the combination may be selected with the consideration that whether or not coagulating property thereof is approximate to each other and whether or not those polymers have affinity.

Non-limiting examples of the preferable combination include:
(a) TFE/PAVE elastomer with TFE/PAVE resin (PFA);
(b) TFE/PAVE elastomer with TFE/HFP resin (FEP);
(c) VdF/HFP elastomer with PVdF resin;
(d) VdF/HFP/TFE elastomer with PVdF resin;
(e) TFE/propylene elastomer with ethylene/TFE resin (ETFE); and the like.

The elastomer composition of the present invention can be prepared by mixing the above-mentioned emulsion of the elastomer particles to the emulsion of the fluorine-containing resin fine particles and then coagulating the mixture. The co-coagulation can be carried out by a known coagulation method. For example, a method of adding a solution of the mixture of the emulsion of the elastomer particles and the emulsion of the fluorine containing resin fine particles dropwise into a coagulating solution, or a method of adding a coagulating solution dropwise into a solution of the emulsion mixture, or the like method can be used.

The concentration of the emulsion mixture may be determined optionally depending on productivity, and is not particularly limited. The concentration is usually from 5 to 50% by weight, preferably from 10 to 30% by weight. It is possible that the emulsion mixture is diluted with pure water 2 to 10 times before the coagulation.

Examples of the co-coagulation methods, include a salting out method, an acid coagulation method, a freeze coagulation method, a method of applying a mechanical shearing force, and the like.

As a coagulating agent, there can be used, for example, an acid such as nitric acid, hydrochloric acid or sulfuric acid; a metal salt such as aluminum nitrate or aluminum sulfate; or the like. Among them, the acid is preferred from the viewpoint of keeping the polymer clean, and the metal salt is preferred from the viewpoint of easiness of handling.

A product obtained by the co-coagulation is washed as required, and dried in a hot air dryer or a vacuum dryer, and thus can be used as a base material for molding.

When the elastomer composition of the present invention is used as a base material, excellent mechanical strength, abrasion resistance, transparency and mold-processability can be imparted to the obtained molded article.

To the elastomer composition of the present invention can be added a crosslinking agent and further a crosslinking accelerator, and thus a crosslinkable elastomer composition can be obtained.

As a crosslinking system, those which have been usually used for an elastomer can be used. Examples thereof arean oxazole crosslinking system, imidazole crosslinking system, thiazole crosslinking system, triazine crosslinking system, peroxide crosslinking system, polyol crosslinking system, polyamine crosslinking system, and the like. Also, crosslinking with radiant ray, electron beam, ultraviolet ray, or the like can be carried out.

Examples of the crosslinking agent which is used in oxazole crosslinking system, imidazole crosslinking system and thiazole crosslinking system area tetraamine crosslinking agent or bisamino(thio)phenol crosslinking agent represented by the formula

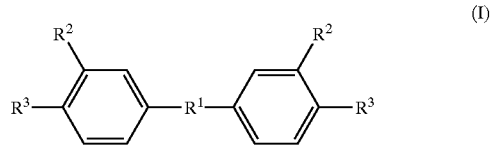

(I)

wherein $R^1$ is —$SO_2$—, —O—, —CO—, an alkylene group having 1 to 6 carbon atoms, a perfluoroalkylene group having 1 to 10 carbon atoms or a single bond, one of $R^2$ and $R^3$ is —$NH_2$ and the other one is —$NH_2$, —OH or —SH, a bisamidrazone crosslinking agent represented by the formula (II):

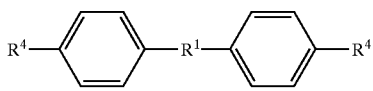
(II)

(wherein $R^1$ is as defined above, $R^4$ is

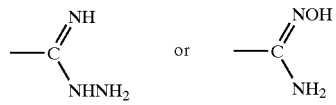

and a bisamidoxime crosslinking agent represented by the formula (III)

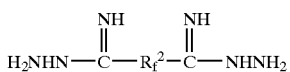
(III)

or (IV):
wherein $R_f^2$ is a perfluoroalkylene group having 1 to 10 carbon atoms,

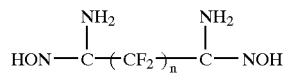
(IV)

wherein n is an integer of 1 to 10, and the like.

As the case demands, crosslinking accelerators may be used in combination.

An amount of the crosslinking agent is from 0.5 to 10 parts by weight, preferably from 1 to 5 parts by weight based on 100 parts by weight of the elastomer, and an amount of the crosslinking accelerator is from 0.1 to 10 parts by weight, preferably from 0.2 to 5 parts by weight based on 100 parts by weight of the elastomer.

Examples of the crosslinking agent to be used in the peroxide crosslinking system include 1,1-bis(t-butylperoxy)-3,5,5-trimethylcyclohexane, 2,5-dimethylhexane-2,5-dihydroperoxide, di-t-butylperoxide, t-butylcumylperoxide, dicumylperoxide, α,α-bis(t-butylperoxy)-p-diisopropylbenzene, 2,5-dimethyl-2,5-di(t-butylperoxy)hexane, 2,5-dimethyl-2,5-di(t-butylperoxy)hexyne-3, benzoylperoxide, t-butylperoxybenzene, 2,5-dimethyl-2,5-di(benzoylperoxy)hexane, t-butylperoxymaleate, t-butylperoxyisopropyl carbonate, and the like.

In case of the peroxide crosslinking, it is desirable to use a crosslinking accelerator. Examples of the crosslinking accelerator are, for instance, triallyl cyanurate, triallyl isocyanurate, triallyl formal, triallyl trimellitate, N,N'-m-phenylenebismaleimide, dipropargyl terephthalate, diallyl phthalate, tetraallyl terephthalateamide, triallyl phosphate, and the like.

An amount of the crosslinking agent is from 0.05 to 10 parts by weight, preferably from 1.0 to 5 parts by weight based on 100 parts by weight of the elastomer, and an amount of the crosslinking accelerator is from 0.1 to 10 parts by weight, preferably from 0.5 to 5 parts by weight based on 100 parts by weight of the elastomer.

A transparent elastomeric molded article can be provided in case where, like the peroxide crosslinking system, an inorganic filler, etc. does not need to be used for crosslinking, coloring does not occur through crosslinking and a vulcanized article from a so-called pure rubber formulation exhibits a transparency.

The transparent elastomeric molded article of the present invention obtained by crosslinking and molding-has a transparency of not more than 50%, preferably not more than 40%, particularly not more than 30% in a haze value.

Examples of the crosslinking agent which can usually be used in the polyol crosslinking system are aromatic polyhydroxy compounds. For example, there are 2,2-bis(4-hydroxyphenyl)propane (so-called "bisphenol A"), 2,2-bis(4-hydroxyphenyl)perfluoropropane (so-called "bisphenol AF"), resorcin, 1,3,5-trihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (so-called "bisphenol B"), 4,4-bis(4-hydroxyphenyl)valerate, 2,2-bis(4-hydroxyphenyl)tetrafluorochloropropane, 4,4'-dihydroxydiphenylsulfone, 4,4'-dihydroxydiphenylketone, tri(4-hydroxyphenyl)methane, 3,3',5,5'-tetrachlorobisphenol A, 3,3',5,5'-tetrabromobisphenol A, alkali metal salt or alkali earth metal salt thereof, and the like.

Also, in the polyol crosslinking system, it is preferable to add a crosslinking accelerator. Examples thereof include ammonium compounds, phosphonium compounds, oxonium compounds, sulfonium compounds, and the like. Particularly, tertiary ammonium salt and tertiary phosphonium salt are preferable.

An amount of the crosslinking agent is from 0.5 to 5 parts by weight based on 100 parts by weight of the elastomer, and an amount of the crosslinking accelerator is from 5 to 400 parts by weight, preferably from 10 to 100 parts by weight based on 100 parts by weight of the crosslinking agent.

As a crosslinking agent to be used for the polyamine crosslinking, there are polyamine compounds. The polyamine compound is a primary amine or secondary amine in which two or more basic nitrogen atoms are bonded in the molecule thereof. In many cases, the amine is modified to be a salt so that a reaction becomes mild. Examples thereof include alkylenediamines such as ethylenediamine carbamate, hexamethylenediamine carbamate and 4,4'-diaminocyclohexylmethane carbamate which are used comparatively well. Also, a Schiff base can be used such as N,N'-dicinnamylidene-1,6-hexamethylenediamine. In addition, the aromatic polyamine compounds having a poor basic property can be used preferably in combination with other basic compounds. Examples of the other basic compound include diphenylguanidine, di-o-triguanidine, diphenylthiourea, 2-mercaptoimidazoline, a compound which has —$NH_2$ and/or —NH— in its molecule and is used as a crosslinking accelerator for a synthetic rubber, a divalent metal hydroxide, and the like.

An addition amount of the crosslinking agent is from 0.1 to 10 parts by weight, preferably from 0.5 to 5 parts by weight based on 100 parts by weight of the elastomer.

Examples of the other additives are a filler (excluding the above-mentioned fluorine-containing resin), a pigment, and the like.

Examples of the filler include inorganic fillers such as carbon black (particularly graphitized carbon black), silicon oxide, titanium oxide and alumina; organic fillers such as polyimide, and the like. An adding amount thereof is not more than 100 parts by weight, preferably from 1 to 50 parts by weight based on 100 parts by weight of the elastomer.

The above-mentioned additives such as a crosslinking agent, a crosslinking accelerator and a filler may be added at the time of the above-mentioned co-coagulation, if possible, or may be mixed after the preparation of the composition comprising the elastomer and the fluorine-containing resin fine particles. The mixing method may be a known kneading method by using a roll, or the like.

A crosslinked molded article can be produced by kneading and crosslinking the thus obtained crosslinkable elastomer composition in which fluorine-containing resin fine particles are finely dispersed. For the kneading, usual methods, for example, kneading by a roll or kneader can be employed For the molding, usual compression molding, injection molding, extrusion molding and transfer molding methods can be employed. The molding conditions may be the same as conventional ones.

The obtained crosslinked molded article maintains transparency of the matrix elastomer when a filler is not contained therein. Though there is a case that the transparency is lowered somewhat, a transmissivity of visible light is maintained at 20% or more of that of the elastomer alone.

The crosslinked molded article of the present invention is excellent in mechanical strength, post-processability, plasma resistance and gas barrier property, irrespective of presence or absence of a filler. Also, since the finely dispersed fluorine-containing resin fine particles are hardly separated from the matrix elastomer, for example, even if the molded article is used as a sealing material for semiconductor production apparatuses, there is less possibility of generating micro-particles.

The elastomer composition of the present invention is suitable for various molded articles shown in Tables 1 to 3 due to its excesllent properties.

TABLE 1

| Field of industry | Sub-field of industry | Final product | Equipment |
|---|---|---|---|
| Electrical | Semi-conductor | Semi-conductor production apparatus | CVD equipment |
| | | Liquid crystal panel production apparatus | Dry etching equipment |
| | | Plasma panel production apparatus | Wet etching equipment |
| | | | Oxidation and diffusion equipment |
| | | | Sputtering equipment |
| | | | Ashing equipment |
| | | | Cleaning equipment |
| | | | Ion implantation equipment |
| Transportation | Vehicle | Car | Engine and peripheral equipment |
| | | | AT |
| | | | Fuel line and peripheral equipment |
| | Aircraft | Aircraft | Fuel line |
| | Rocket | Rocket | Fuel line |
| | Ship | Ship | Fuel line |

Parts

O (square) ring, packing, sealing material, tube, roll, coating, lining, gasket, diaphragm, hose
Gasket, shaft seal, valve stem seal, sealing material, hose
Hose, sealing material
O (square) ring, tube, packing, core material of valve, hose, sealing material, diaphragm
Diaphragm, O (square) ring, valve, tube, packing, hose, sealing material TABLE 1-continued

| | | | |
|---|---|---|---|
| Chemical | Chemical products | Plant | Production line of chemicals such as pharmaceutical, agricultural chemical, coating and resin (Petroleum) |
| Mechanical | Chemicals Photograph | Pharmaceuticals Developing machine | Plug for chemicals Film developing machine X-ray film developing machine |
| | Printing | Printing machine | Printing roll |
| | Coating | Coating facilities | Coating roll |
| | Analyzer and physical and chemical appliances | | |
| Food | Plant | | Food processing line |
| Metal | Steel making | Steel sheet processing facilities | Steel sheet processing roll |

Lining, valve, packing, roll, hose, diaphragm, O (square) ring, tube, sealing material
Plug for chemicals
Roll
Roll
Roll
Roll
Tube
Lining, valve, packing, roll, hose, diaphragm, O (square) ring, tube, sealing material
Roll

TABLE 2

| Field of Industry | Characteristics Required |
|---|---|
| Electrical | Plasma resistance, acid resistance, alkali resistance, amine resistance, ozone resistance, gas resistance, chemical resistance, cleanliness, heat resistance |
| Transportation | Heat resistance, amine resistance |
| | Heat resistance, amine resistance |
| | Fuel resistance, fuel permeability, heat resistance |
| | Fuel resistance, fuel permeability, heat resistance |
| | Fuel resistance, fuel permeability, heat resistance |
| | Fuel resistance, fuel permeability, heat resistance |
| Chemical | Chemical resistance, solvent resistance, heat resistance |
| | Chemical resistance, solvent resistance, heat resistance |
| | Cleanliness |
| Mechanical | Chemical resistance |
| | Chemical resistance |
| | Solvent resistance |
| | Solvent resistance |
| Food | Chemical resistance, solvent resistance, heat resistance |
| Metal | Heat resistance, acid resistance |

TABLE 3

| Field of industry | Parts |
|---|---|
| Electrical | O ring and sealing material for gate valve of corresponding production equipment |
| | O ring and sealing material for quartz window of corresponding production equipment |
| | O ring and sealing material for chamber of corresponding production equipment |
| | O ring and sealing material for gate of corresponding production equipment |
| | O ring and sealing material for bell jar of corresponding production equipment |
| | O ring and sealing material for coupling of corresponding production equipment |
| | O ring and sealing material for pump of corresponding production equipment |
| | O ring and sealing material for gas controller for semi-conductor of corresponding production equipment |
| | O ring and sealing material for resist developing and releasing solutions |
| | O ring and sealing material for wafer cleaning solution |
| | Diaphragm of pump for corresponding production equipment |
| | Hose for resist developing and releasing solutions |
| | Hose and tube for wafer cleaning solution |
| | Roll for transferring wafer |
| | Lining and coating of tanks for resist developing and releasing solutions |
| | Lining and coating of tanks for wafer cleaning solution |
| | Lining and coating of tanks for wet etching |
| Transportation | Engine head gasket |
| | Metal gasket |
| | Crank shaft seal |
| | Cam shaft seal |
| | Valve stem seal |
| | Manifold packing |
| | Oil hose |
| | ATF hose |
| | Injector O ring |
| | Injector packing |
| | O ring and diaphragm for fuel pump |
| | Fuel hose |
| Chemical | |
| Mechanical | Developing roll |
| | Developing roll |
| | Gravure roll |
| | Guide roll |
| | Gravure roll for magnetic tape production and coating line |
| | Guide roll for magnetic tape production and coating line |
| | Various coating rolls |
| Food | |
| Metal | |

Particularly the molded articles of the present invention can be built-in the following semiconductor manufacturing equipment.

(1) Etching System
  Dry Etching Equipment
    Plasma etching machine
    Reactive ion etching machine
    Reactive ion beam etching machine
    Sputter etching machine
    Ion beam etching machine
  Wet Etching Equipment
  Ashing Equipment (2) Cleaning System
  Dry Etching Cleaning Equipment
    $UV/O_3$ cleaning machine
    Ion beam cleaning machine
    Laser beam cleaning machine
    Plasma cleaning machine
    Gas etching cleaning machine
  Extractive Cleaning Equipment
    Soxhlet extractive cleaning machine
    High temperature high pressure extractive cleaning machine
    Microwave extractive cleaning machine
    Supercritical extractive cleaning machine (3) Exposing System
  Stepper
  Coater and Developer (4) Polishing System
  CMP Equipment (5) Film Forming System
  CVD Equipment
  Sputtering Equipment (6) Diffusion and Ion Implantation System
  Oxidation and Diffusion Equipment
  Ion Implantation Equipment The present invention is then explained by means of examples and preparation examples, but is not limited to them.

PREPARATION EXAMPLE 1

(Preparation of Emulsion of Fluorine-Containing Elastomer Particles)

A 47-liter stainless steel autoclave having no ignition source was charged with 30 liter of pure water, 300 g of $C_7F_{15}COONH_4$ as an emulsifing agent and 2.7 g of disodium phosphate.$12H_2O$ as a pH control agent. After the inside of a system was sufficiently replaced with nitrogen gas and deairing was carried out, the autoclave was heated to 50° C. with stirring at 200 rpm, and a gas mixture of tetrafluoroethylene (TFE)/perfluoro(methyl vinyl ether) (PMVE) (TFE/PMVE=24/76 in mole ratio) was introduced so that the inside pressure became 1.18 MPa. Then, 100 ml of an aqueous solution of ammonium persulfate (APS) having a concentration of 55.8 mg/ml was introduced with pressurized nitrogen gas to initiate a reaction.

With the advance of the polymerization, at the time when the inside pressure lowered to 1.08 MPa, 62.3 g of di-iodine compound $[I(CF_2)_4I]$ was introduced with pressurized nitrogen gas. Then, 60 g of TFE was introduced at its self-pressure and 60 g of PMVE was introduced with a plunger pump so that the inside pressure became 1.18 MPa. Thereafter, with the advance of the reaction, pressurized TFE and PMVE were introduced in the same manner. Thus, increasing and decreasing of the inside pressure were repeated between 1.08 MPa and 1.18 MPa, and at the time when a total amount of TFE and PMVE reached 6.5 kg, 7.8 kg, 9.1 kg and 10.4 kg, respectively, 25.6 g of an iodine compound $CF_2=CFOCF_2CF_2CH_2I$ was introduced with pressurized nitrogen gas. Every 12 hours after starting of the polymerization, 20 ml of an aqueous solution of APS having a concentration of 52.5 mg/ml was introduced with pressurized nitrogen gas.

When a total amount of the introduced TFE and PMVE reached 13 kg, i.e., 33 hours after starting of the polymerization reaction, the autoclave was cooled and the un-reacted monomer was released to obtain an emulsion (A-1) of fluorine-containing elastomer particles (average particle size: 70 nm) having a solid concentration of 27.5% by weight.

A part of the emulsion was sampled and nitric acid was added thereto for coagulation. The coagulated product was washed and dried to obtain elastomer particles. The Mooney viscosity $ML_{1+10}$ (100° C.) of the elastomer was 42, and according to $^{19}$F-NMR analysis, the components thereof was TFE/PMVE=62/38 (% by mole). The glass transition temperature Tg (center value) measured according to DSC was −3° C.

PREPARATION EXAMPLE 2
(Preparation of Emulsion of Fluorine-Containing Resin Fine Particles)

A 6-liter stainless steel autoclave having no ignition source was charged with 3 liter of pure water, 30 g of $C_3F_7OCF(CF_3)CF_2OCF(CF_3)COONH_4$ as an emulsifying agent and 0.27 g of disodium phosphate.12H$_2$O as a pH control agent. After the inside of a system was sufficiently replaced with nitrogen gas and deairing was carried out, the autoclave was heated to 80° C. with stirring at 600 rpm, and a gas mixture of tetrafluoroethylene (TFE)/perfluoro(methyl vinyl ether) (PMVE) (TFE/PMVE=88/12 in mole ratio) was introduced so that the inside pressure became 0.20 MPa. Then, 4 ml of an aqueous solution of ammonium persulfate (APS) having a concentration of 2.5 mg/ml was introduced with pressurized nitrogen gas to initiate a reaction.

With the advance of the polymerization, at the time when the inside pressure was lowered to 0.15 MPa. A gas mixture of TFE/PMVE (TFE/PMVE=95/5 in mole ratio) was then introduced with pressurized nitrogen gas so that the inside pressure became 0.20 MPa. Thereafter, with the advance of the reaction, pressurized TFE and PMVE gas mixture (95/5 in mole ratio) was introduced similarly. Thus, increasing and decreasing of the inside pressure were repeated between 0.15 MPa and 0.20 MPa.

When a total amount of the introduced TFE and PMVE reached 331 g, i.e., 4.5 hours after starting of the polymerization reaction, the autoclave was cooled and the un-reacted monomer was released to obtain an emulsion (B-1) of fluorine-containing resin fine particles (average particle size: 44 nm) having a solid concentration of 9.7% by weight. The average particle size was determined by mixing 120 mg of the emulsion and 4.4 g of dimethylsulfoxide and measured with LPA-3000, 3100 available from OTSUKA DENSHI KABUSHIKI KAISHA.

A part of the emulsion was sampled and nitric acid was added thereto for coagulation. The coagulated product was washed and dried to obtain a white fluorine-containing resin fine powder. The melt flow rate MFR of the fluorine-containing resin could not be measured under conditions of maintaining at 372° C. for five minutes. According to $^{19}$F-NMR analysis, the components thereof was TFE/PMVE=94.5/5.5 (% by mole). The melting point measured according to DSC was 290° C.

PREPARATION EXAMPLE 3
(Preparation of Emulsion of Fluorine-Containing Resin Fine Particles)

A 6-liter stainless steel autoclave having no ignition source was charged with 3 liter of pure water, 30 g of $C_3F_7OCF(CF_3)CF_2OCF(CF_3)COONH_4$ as an emulsifying agent and 0.27 g of disodium phosphate.12H$_2$O as a pH control agent. After the inside of a system was sufficiently replaced with nitrogen gas and deairing was carried out, the autoclave was heated to 80° C. with stirring at 600 rpm, and a gas mixture of tetrafluoroethylene (TFE)/perfluoro(methyl vinyl ether) (PMVE) (TFE/PMVE=88/12 in mole ratio) was introduced so that the inside pressure became 0.20 MPa. Then, 4 ml of an aqueous solution of ammonium persulfate (APS) having a concentration of 2.5 mg/ml was introduced with pressurized nitrogen gas to initiate a reaction.

With the advance of the polymerization, at the time when the inside pressure was lowered to 0.15 MPa, 2.92 g of a di-iodine compound $[I(CF_2)_4I]$ was introduced with pressurized nitrogen gas and then, a gas mixture of TFE/PMVE (TFE/PMVE=95/5 in mole ratio) was introduced with pressurized nitrogen gas so that the inside pressure became 0.20 MPa. Thereafter with the advance of the reaction, pressurized TFE/PMVE gas mixture (95/5 in mole ratio) was introduced similarly. Thus, increasing and decreasing of the inside pressure were repeated between 0.15 MPa and 0.20 MPa.

When a total amount of the introduced TFE and PMVE reached 327 g, i.e., 9.9 hours after starting of the polymerization reaction, the autoclave was cooled and the un-reacted monomer was released to obtain an emulsion (B-2) of fluorine-containing resin fine particles (average particle size: 44 nm) having a solid concentration of 9.4% by weight.

A part of the emulsion was sampled and nitric acid was added thereto for coagulation. The coagulated product was washed and dried to obtain a white fluorine-containing resin fine powder. The melt flow rate MFR of the fluorine-containing resin was 21.1 g/10 min under conditions of maintaining at 372° C. for five minutes. According to $^{19}$F-NMR analysis, the components thereof was TFE/PMVE=94.9/5.1 (% by mole). The melting point measured according to DSC was 280.7° C.

PREPARATION EXAMPLE 4
(Preparation of Emulsion of Fluorine-Containing Elastomer Particles)

A 3-liter stainless steel autoclave having no ignition source was charged with 1 liter of pure water, 10 g of $C_3F_7OCF(CF_3)CF_2OCF(CF_3)COONH_4$ as an emulsifying agent and 0.09 g of disodium phosphate.12H$_2$O as a pH control agent. After the inside of a system was sufficiently replaced with nitrogen gas and deairing was carried out, the autoclave was heated to 53° C. with stirring at 600 rpm, and a gas mixture of tetrafluoroethylene (TFE)/perfluoro(methyl vinyl ether) (PMVE) (TFE/PMVE=25/75 in mole ratio) was introduced so that the inside pressure became 0.78 MPa. Then, 20 ml of an aqueous solution of ammonium persulfate (APS) having a concentration of 264 mg/ml was introduced with pressurized nitrogen gas to initiate a reaction.

With the advance of the polymerization, at the time when the inside pressure lowered to 0.69 MPa, 2.2 g of $CF_2\!=\!CFOCF_2CF(CF_3)OCF_2CF_2CN$ (CNVE) was introduced with pressurized nitrogen gas. Then, 4.7 g of TFE and 5.3 g of PMVE were introduced at the respective self-pressures. Thereafter, with the advance of the reaction, pressurized TFE and PMVE were introduced similarly. Thus, increasing and decreasing of the inside pressure were repeated between 0.69 MPa and 0.78 MPa, and in addition, at the time when a total amount of the introduced TFE and PMVE reached 70 g. 2.2 g of CNVE was introduced with pressurized nitrogen gas.

When a total amount of the introduced TFE and PMVE reached 130 g, i.e., six hours after starting of the polymerization reaction, the autoclave was cooled and the un-reacted monomer was released to obtain 1,160 g of emulsion (A-2) of fluorine-containing elastomer particles having a solid concentration of 11.3% by weight.

Then, 100 g of the obtained emulsion was diluted with 300 g of water, and added slowly to 280 g of an aqueous solution of 3.5% by weight of hydrochloric acid with stirring. After the addition, stirring was carried out for five minutes and a coagulated product was filtrated. The obtained elastomer particles were further washed with 200 g of HCFC-141b and filtrated. After the washing with HCFC-141b and the filtration were repeated four times, vacuum drying was carried out at 60° C. for 72 hours to obtain 11.2 g of fluorine-containing elastomer.

As a result of $^{19}$F-NMR analysis, the obtained fluorine-containing elastomer was one comprising TFE/PMVE/CNVE=60.4/38.9/0.7 (% by mole).

EXAMPLE 1

The emulsion of the fluorine-containing elastomer particles (A-1) prepared in Preparation Example 1 and the emulsion of the fluorine-containing resin fine particles (B-1) prepared in Preparation Example 2 were mixed in the amounts of 1,236 g and 619 g, respectively (solid content ratio: fluorine-containing elastomer/fluorine-containing resin=85/15 in weight ratio), and the mixture was added dropwise over 10 minutes to 411 g of a 9% aqueous solution of nitric acid being stirred and thus subjected to co-coagulation. The obtained co-coagulate was washed with water and dried to obtain an elastomer composition comprising the fluorine-containing resin fine particles finely dispersed in the fluorine-containing elastomer.

When the elastomer composition was subjected to DTA measurement, there was an absorption at 272.6° C. which is believed to be derived from the fluorine-containing resin. The composition was transparent (haze value: 12%).
(Measurement of Haze Value)

A 0.7 mm thick sample is produced from the elastomer composition at a melting temperature thereof (60° to 150° C.) by applying a pressure thereto if necessary. A haze value of the sample is measured with a direct current haze meter (a measuring device according to JIS K7105 and ASTM D 1003 available from TOYO SEIKI KABUSHIKI KAISHA).

A haze value of a crosslinked molded article described hereinbelow is measured by using a 2 mm thick sample sheet produced by crosslinking and molding the elastomer composition.

FIG. 1 shows a photograph of the elastomer composition taken at ×20000 magnification with a transmission type electron microscope (TEM) by a replica method. In FIG. 1, convex portions in the form of particle are fine particles of the fluorine-containing resin. It can be seen that many fluorine-containing resin fine particles (average particle size: about 40 nm) are finely dispersed uniformly. This finely dispersed state clearly differs from that of a composition in a TEM photograph (FIG. 2) obtained in Comparative Example 3 described hereinbelow.

EXAMPLE 2

Co-coagulation was carried out in the same manner as in Example 1 except that the mixing amount of the emulsion (B-1) of the fluorine-containing resin fine particles was changed to 412 g, to obtain an elastomer composition (solid content ratio: fluorine-containing elastomer/fluorine-containing resin=90/10 in weight ratio). The composition was transparent (haze value: 12%).

EXAMPLE 3

Co-coagulation was carried out in the same manner as in Example 1 except that the mixing amount of the emulsion (B-1) of the fluorine-containing resin fine particles was changed to 206 g, to obtain an elastomer composition (solid content ratio: fluorine-containing elastomer/fluorine-containing resin=95/5 in weight ratio). The composition was transparent (haze value: 11%).

EXAMPLE 4

Co-coagulation was carried out in the same manner as in Example 1 except that 638 g of the emulsion (B-2) of the fluorine-containing resin fine particles obtained in Preparation Example 3 was mixed instead of the emulsion (B-1) of the fluorine-containing resin fine particles, to obtain an elastomer composition (solid content ratio: fluorine-containing elastomer/fluorine-containing resin=85/15 in weight ratio). The composition was transparent (haze value: 12%).

EXAMPLE 5

To 100 parts by weight of the elastomer composition prepared in Example 1 were mixed 1 part by weight of 2,5-dimethyl-2,5-di(t-butylperoxy)hexane as a crosslinking agent and 1 part by weight of triallyl isocyanurate as a crosslinking accelerator. The mixture was kneaded with an open roll to obtain a crosslinkable elastomer composition.

Vulcanizability of the crosslinkable elastomer composition was determined by a method described hereinbelow. The results are shown in Table 4.

Further, the crosslinkable elastomer composition was subjected to press-crosslinking at 150° C. for 30 minutes and then crosslinking in an oven at 180° C. for four hours to obtain a crosslinked article. Physical properties in normal state of the crosslinked article were measured. Also, an O-ring (P-24) was produced under the same crosslinking conditions and a compression set thereof was measured. Further, a haze value of the crosslinked elastomer sheet (2 mm thick) was measured. The results are shown in Table 4.
(Vulcanizability)

A vulcanization curve of each composition for vulcanization is obtained at a temperature shown in Table 4 by using a JSR Curastometer Model II, and a minimum torque, maximum torque, induction time and optimum vulcanization time are obtained therefrom.
(Physical Properties in Normal State)

100% modulus, tensile strength, tensile elongation and hardness (JIS A hardness) in normal state (25° C.) are measured according to JIS K6301.
(Compression Set)

A compression set after allowing to stand at 200° C. for 70 hours is measured according to JIS K6301.

EXAMPLES 6 TO 10

A crosslinkable elastomer composition having components shown in Table 4 was prepared in the same manner as in Example 5 and vulcanizability thereof was determined. Also a crosslinked article was produced under the same crosslinking conditions as in Example 5, and physical properties in normal state, compression set and haze value were determined. The results are shown in Table 4.

A filler mixed in Examples 6 to 8 is a silicon oxide (AEROSIL 300 available from NIPPON AEROSIL KABUSHIKI KAISHA).

COMPARATIVE EXAMPLES 1 TO 2

A crosslinkable elastomer composition (haze value: 10%) was prepared in the same manner as in Example 5 except that fluorine-containing resin fine powder was not mixed. Vulcanizability of the composition was determined, and also a crosslinked article was produced under the same crosslinking conditions as in Example 5, and physical properties in normal state and compression set were determined. The results are shown in Table 4.

COMPARATIVE EXAMPLE 3

Figure 2:
FIG. 2 is a photograph (×20000) taken by a transmission type electron microscope of the elastomer composition obtained in Comparative Example 3.

To the emulsion (A-1) of the fluorine-containing elastomer particles obtained in Preparation Example 1 was added a nitric acid for coagulation thereof, and the coagulate was washed and dried to obtain elastomer particles. On the other hand, to the emulsion (B-1) of the fluorine-containing resin fine particles obtained in Preparation Example 2 was added a nitric acid for coagulation thereof, and the coagulate was washed and dried to obtain a white fluorine-containing resin powder. To 85 parts by weight, of the elastomer particles was dry-blended 15 parts by weight of the fluorine-containing resin powder to obtain a white opaque composition (haze value: 82%). A TEM photograph (×20000) of the composition is shown in FIG. 2. As it is clear from FIG. 2, an elastomer portion (flat portions at both sides in FIG. 2) is separated clearly from a portion where fluorine-containing resin fine particles are agglomerated (a portion having a coarse surface at a center in FIG. 2).

A crosslinkable elastomer composition was prepared in the same manner as in Example 5 except that the above-mentioned composition was used, and vulcanizability thereof was determined. Also a crosslinked article was produced under the same crosslinking conditions as in Example 5, and physical properties in normal state, compression set and haze value were determined. The results are shown in Table 4.

18%) comprising the fluorine-containing resin fine particles finely dispersed in the fluorine-containing elastomer.

EXAMPLE 12

A crosslinkable elastomer composition was prepared by kneading 1.45 parts by weight of 2,2-bis-[(3-amino-4-phenylamino)phenyl]hexafluoropropane (synthesized by a method described in Journal of Polymer Science, edited by Polymer Chemistry, Vol. 20, 2381 to 2393 (1982)) as a crosslinking agent based on 100 parts by weight of the elastomer composition prepared in Example 11 by using an open roll. Vulcanizability of the obtained crosslinkable elastomer composition which was determined by the above-mentioned method was as follows.

Vulcanizability (170° C.)
  Minimum torque: 0.45 kg
  Maximum torque: 2.90 kg
  Induction time: 4.4 min
  Optimum vulcanization time: 8.7 min Further, the crosslinkable elastomer composition was subject to press-crosslinking at 170° C. for 15 minutes and crosslinking in an oven at 204° C. for 18 hours and then at 288° C. for 18 hours to obtain a crosslinked article. Physical properties in normal state of the obtained crosslinked article was also determined in the same manner as above, and also an O-ring (P-24) was produced under the same conditions as above to determine its compression set. The results are as follows.

TABLE 4

|  | Ex. 5 | Ex. 6 | Ex. 7 | Ex. 8 | Ex. 9 | Ex. 10 | Com. Ex. 1 | Com. Ex. 2 | Com. Ex. 3 |
|---|---|---|---|---|---|---|---|---|---|
| Elastomer composition | | | | | | | | | |
| Example 1 | 100 | 100 | | | | 100 | | | |
| Example 2 | | | 100 | | | | | | |
| Example 3 | | | | 100 | | | | | |
| Example 4 | | | | | 100 | | | | |
| Preparation Example 1 (elastomer) | | | | | | | 100 | 100 | 85 |
| Preparation Example 2 (fluorine-containing resin powder) | | | | | | | | | 15 |
| Crosslinking agent | 1 | 1 | 1 | 1 | 1 | 1 | 1 | 1 | 1 |
| Crosslinking accelerator | 1 | 3 | 3 | 3 | 1 | 0.5 | 1 | 3 | 1 |
| SiO$_2$ | — | 3 | 3 | 3 | — | — | — | 3 | — |
| Vulcanizability (160°) | | | | | | | | | |
| Minimum torque (kg) | 0.18 | 0.40 | 0.27 | 0.15 | 0.10 | 0.17 | 0.03 | 0.10 | 0.06 |
| Maximum torque (kg) | 4.51 | 7.70 | 7.20 | 6.15 | 5.02 | 4.12 | 3.98 | 6.00 | 4.71 |
| Induction time (min) | 0.7 | 0.5 | 0.5 | 0.5 | 0.6 | 0.7 | 0.5 | 0.6 | 0.5 |
| Optimum vulcanization time (min) | 1.4 | 1.4 | 1.2 | 1.4 | 1.5 | 1.4 | 1.1 | 1.1 | 0.9 |
| Physical properties in normal state | | | | | | | | | |
| 100% modulus (MPa) | 4.5 | 13.8 | 7.4 | 6.4 | 3.7 | 4.5 | 2.1 | 4.9 | 4.7 |
| Tensile strength (MPa) | 20.8 | 24.9 | 22.8 | 16.3 | 18.3 | 19.7 | 12.3 | 16.5 | 8.6 |
| Elongation (%) | 202 | 155 | 208 | 152 | 197 | 208 | 186 | 180 | 168 |
| Hardness (JIS A) | 71 | 80 | 75 | 71 | 71 | 70 | 60 | 68 | 71 |
| Compression set (%) | 33 | 27 | 22 | 12 | 34 | 36 | 18 | 13 | 37 |
| Haze value (%) | 41 | — | — | — | 43 | 20 | — | — | 82 |

EXAMPLE 11

The fluorine-containing elastomer particles (A-2) prepared in Preparation Example 4 and the fluorine-containing resin fine particles (B-1) prepared in Preparation Example 2 were mixed in the amounts of 300 g and 619 g, respectively in a ratio of fluorine-containing elastomer/fluorine-containing resin=85/15 (weight ratio), and the mixture was added dropwise over 20 minutes for co-coagulation to 981 g of a 9% aqueous solution of nitric acid being stirred. The obtained coagulate was washed with water and dried to obtain a transparent elastomer composition (haze value:

Physical Properties in Normal State
  100% modulus: 2.9 MPa
  Tensile strength: 19.4 MPa
  Elongation: 252%
  Hardness (JIS A): 74
Compression Set (200° C., 70 Hours, 25% Compression)
  Compression set: 15%

INDUSTRIAL APPLICABILITY

The present invention can provide a composition capable of producing an elastomeric molded article excellent in mechanical strength, abrasion resistance, transparency, etc.

What is claimed is:

1. An elastomeric molded article which is obtained by vulcanizing and molding a transparent elastomer composition comprising an elastomer and fluorine-containing resin fine particles which are finely dispersed in the elastomer, said fluorine-containing resin fine particles having an average particle size of from 20 to 100 nm.

2. The elastomeric molded article of claim 1, which is transparent.

3. The elastomeric molded article of claim 2, which has a haze value of not more than 50%.

4. An elastomeric molded article which is obtained by vulcanizing and molding a composition comprising a transparent elastomer composition which comprises an elastomer and fluorine-containing resin fine particles which are finely dispersed in the elastomer and further containing a filler, said fluorine-containing resin fine particles having an average particle size of from 20 to 100 nm.

5. The elastomeric molded article of claims 4, which is transparent.

6. The elastomeric molded article of claim 5, which has a haze value of not more than 50%.

* * * * *